Figure 1:
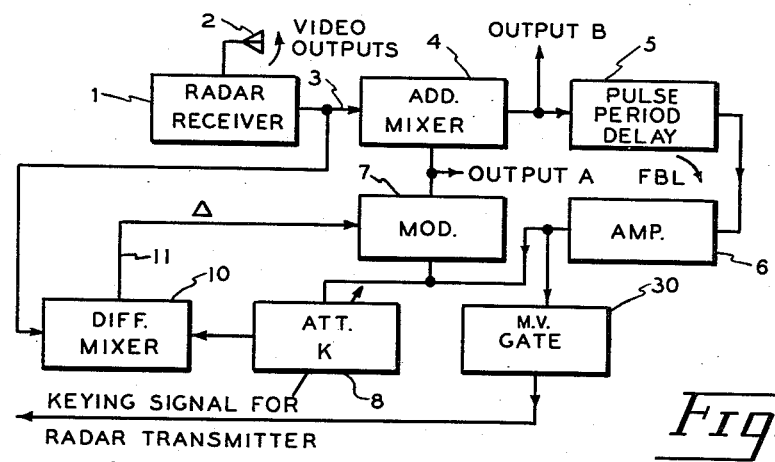

July 10, 1962 — A. A. VARELA — 3,044,060
SYSTEM FOR INCREASING THE DEFINITION OF PULSE ECHO RADAR
Filed Aug. 31, 1954 — 2 Sheets-Sheet 1

INVENTOR
ARTHUR ALEXIS VARELA
BY
ATTORNEY

United States Patent Office 3,044,060
Patented July 10, 1962

3,044,060
SYSTEM FOR INCREASING THE DEFINITION OF PULSE ECHO RADAR
Arthur Alexis Varela, Alexandria, Va., assignor, by mesne assignments, to Melpar, Inc., Falls Church, Va., a corporation of Delaware
Filed Aug. 31, 1954, Ser. No. 453,286
23 Claims. (Cl. 343—17.1)

The present invention relates generally to radar systems, and more particularly to systems for increasing the definition of pulse radar systems by processing the pulses.

The term "definition" as used herein is taken to mean the brightness and sharpness of discrete target signals on a radar indicator, and may be measured in terms of brightness at the center of the signal area relative to noise background and rate of change of brightness at the edges of the signal. The term "resolution" is employed to indicate distinguishability of two or more closely spaced targets. Both these terms must be considered as a function of antenna beam width.

It is a basic object of the present invention to provide a radar system of increased definition and resolution.

It is further a basic object of the present invention to provide a system of pulse processing, applicable to existing types of pulse radar systems, which enables an increase of definition and resolution to be attained.

It is recognized that no improvement beyond a certain point is possible, in respect to resolution and definition of radar systems, by the treatment of radar pulses in linear filters, because this treatment is fundamentally incapable of increasing signal-to-noise ratio, i.e., the information content of the pulses. Attempts to accentuate pulses, as against noise, by non-linear amplification, are not successful for relatively weak signals because the noise background becomes coarse, and weak signals become difficult to identify.

Various devices other than those stated have been attempted, including mono-pulse radar systems, systems employing exact pulse superposition on the indicator during radar scan, and systems employing dual receiving beams with comparison of the signals received on the separate beams. These systems are all found to be advantageous in certain respects, but to have serious disadvantages under important operating conditions.

In accordance with the present invention, radar definition and resolution are improved by utilizing the rate of change of the video output, as a target is scanned, to accentuate certain signal characteristics. The rate of change of video with scan is measured by storing the video signals for a pulse repetition period, and comparing successive pulses, i.e. an incoming pulse with a stored pulse. Successive pulses are desirably integrated, to avoid loss of contrast or sensitivity, which involves pulse storage, and it is an important feature of the present invention that the two storage functions can be combined in a single device, the rate of change of video signal with scan being employed to control the integration of signals, so as to produce an improvement in both definition and resolution, while the integration process itself improves contrast.

It is desirable at the outset to indicate that improvement in contrast alone, and in weak signal detection, can be accomplished by signal pulse integration. However, this expedient reduces rather than improves definition and resolution. Assume that an integration circuit is employed which consists of a repetition period delay device, included in a feed-back loop returning video pulses to their source. Successive pulses will thereby be additive. The feed-back loop will normally have attenuation B. It can be shown that the output of the systems $S_{out}$ is then equal to $$S_{in} \frac{1}{1-B}$$

However, the feed-back loop also feeds back noise deviation, which builds up as $$\sqrt{\frac{1}{1-B^2}}$$

It follows that repeating and adding pulse signals, in the presence of noise, will build up the pulse signals more rapidly than the noise, with a consequent increase in signal-to-noise ratio. However, the build-up and decay of the integrated signal output lag behind the build-up and decay of the impressed signal, as a function of B, so that resolution and definition suffer. For example, calculations based on one set of radar parameters, provides the specific result that for a gain in contrast of 7.44 db, in a delayed feed-back integrator type system, the peak of the response curve of the system due to scan was removed .22 beam width from the true center of the scanning process, and the response curve of the system was broadened by about 20%.

It is further found that as a radar equipment scans, assuming use of repetition rate feed-back integration, the decay rate of the response curve as the beam leaves a target is lower than the build-up as the beam approaches a target. This results in a loss of resolution.

It can be shown by plotting direct signal voltage as a function of scan angle, and integrated signal voltage as a function of scan angle, that the difference voltage between the two is positive on rise and negative on decay of the direct signal.

It is a feature of the present invention to control the gain of the feed-back loop, in response to the algebraic value of the difference voltage, so that feed-back increases during signal rise and decreases during signal decay. Both rise and decay of the integrated signal will lag relative to the direct signal, but it is possible to make the lag in decay much less than the lag in rise, in the manner stated, and thereby to improve both definition and resolution.

It is, accordingly, a more specific object of the present invention to provide a novel radar system employing pulse integration of successive signals, in a re-entrant loop, wherein the voltage difference between input to and output from the loop is employed to control the gain of the loop in such sense and degree that the resolution, contrast and definition of the radar system are all simultaneously improved.

It has further been found that the absolute difference in amplitude between incoming and delayed pulses varies in accordance with the absolute value of the derivative of the signal envelope, being large during the maximum rise and decay periods and relatively small at the signal peak. A further feature of this invention is the employment of the absolute difference signal to inversely control the output signal supplied to the radar indicator, whereby the azimuth sharpening effect is enhanced.

Still further, it is a feature of the invention that the pulse delay period may be increased to equal two or more pulse repetition periods before effecting an amplitude comparison between received and delayed pulses, whereby the amplitude of the difference of compared pulses is increased, with consequent increase in effectiveness of the feed-back control.

The above and still further features, objects, and advantages of the present invention will become apparent upon consideration of the following detailed description of a specific embodiment of the invention, especially when taken in conjunction with the accompanying drawings, wherein:

FIGURE 1 is a functional block diagram of the basic system of the present invention; and FIGURES 2–5 are functional block diagrams of modifications of the system of FIGURE 1.

Referring now more particularly to FIGURE 1 of the accompanying drawings, the reference numeral 1 denotes a radar receiver, part of a complete radar system, preferably including a scanning pulse transmitter (not illustrated). The receiver 1 is provided with a directional antenna 2, assumed to be scanning in azimuth, although I do not desire to be limited as to character or fact of scan, in that it may suffice that the transmitter alone scans or that the receiver system alone scans. Video output from receiver 1 appears on lead 3, in the form of pulses having a definite and fixed repetition time. One or several targets may be assumed within the beam of the antenna 2, and it may further be assumed that a plurality of pulses derive from each target during a scan through the target.

The video pulses on lead 3 proceed to an additive mixer 4, from which they are applied to a delay device 5, which delays each pulse by the time of one pulse repetition period. The delayed pulse is suitably amplified in an amplifier 6, and applied jointly to a modulator or gain control circuit 7 and to an attenuator 8. The attenuated output of the attenuator 8, and the signal present on lead 3 are applied to a differential mixer 10, which derives the difference between voltages applied thereto, on a lead 11. The difference voltage on lead 11 is applied to modulator 7 and controls the gain thereof, whereby the level of signal supplied by amplifier 6 to modulator 7 is controlled by the difference voltage. Output signal may then be derived at the output of modulator 7 (output A), or at the output of additive mixer 4 (output B).

Following through an operation of the system illustrated in FIGURE 1 of the accompanying drawings, pulses are received at equal time intervals from a target, by antenna 2. As the antenna scans, the amplitudes of the pulses increase to a maximum, when the target is in the center of the antenna beam, and then decreases to zero. The pulses pass through additive mixer 4 and via delay device 5, amplifier 6 and modulator 7, constituting a feed-back loop, FBL, are returned to the additive mixer. Since the delay time is equal to the pulse repetition time of the feed-back loop successive pulses add in the additive mixer, and an integrated output appears as "output B."

The output of delay device 5 is further algebraically subtracted from the output of receiver 1, in differential mixer 10, the difference voltage constituting a gain control voltage. This voltage is applied to the modulator 7, in the feed-back loop, FBL, and controls the amplitude of feed-back signal. The attenuator 8 serves to set the peak value of one input to mixer 10, thus enabling formation of an algebraic difference having positive and negative values, in the course of each scan.

It has been shown that with a suitable attenuation factor applied to the feed-back voltage the difference voltage is of opposite sign during rise and decay, respectively, of the video envelope due to antenna scan. Accordingly, the difference voltage is used to control the gain of the feed-back loop, FBL, so that feed-back increases during rise of the envelope and decreases during decay. The build-up of signal in closed feed-back loop is a regenerative action and will lag the build-up of signal at the input by an amount depending on the loop gain, which must be less than one to begin. But the only limitation on decay of the signal in the feed-back loop is the requirement that the attenuated feed-back signal be greater than the input signal. Hence, the output signal decay may lag only slightly that of the input signal. Since the lag in decay can be substantially less than the lag in build-up, the envelope of the output signal, measured in terms of width at a certain percentage of the peak value, will be substantially less than that of the normal video signal. The net result is a gain of contrast as well as of resolution and definition.

Figure 2:
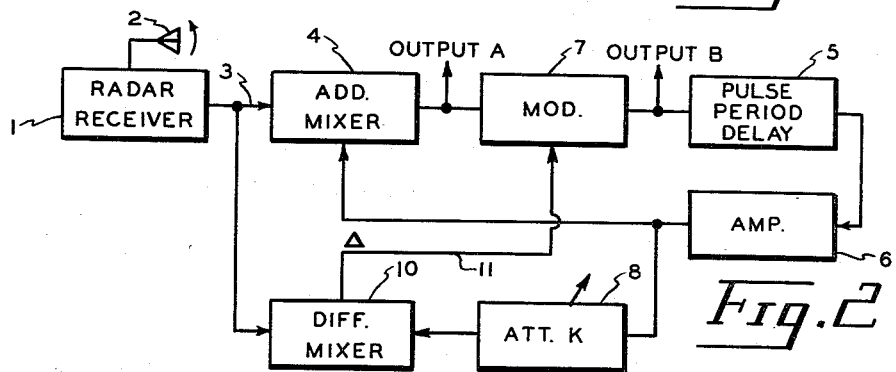

Referring now to FIGURE 2 of the accompanying drawings, the reference numeral 1 denotes a radar receiver, and 2 a scanning antenna, as in the system of FIGURE 1. The output of the receiver is applied to additive mixer 4, via a lead 3, and thence in cascade to a modulator 7, a pulse period delay device 5 and amplifier 6, as in FIGURE 1, is applied via an attenuator 8 to a differential mixer 10, to which is also applied the video output of receiver 1, the difference voltage output being applied as a gain control voltage to modulator 7.

The distinction between the systems of FIGURES 1 and 2 resides then primarily in the location of the modulator 7. In FIGURE 1 the modulator 7 is connected directly to an input of additive mixer 4, while in FIGURE 2 it is connected directly to an output of additive mixer 4. In both cases the modulator is in the feed-back loop, and in both cases the finally processed pulses may be derived from the output of the additive mixer 4 or from the output of the modulator 7.

General comments may be made concerning optimum conditions of operation of the systems of FIGURES 1 and 2. The optimum value of K for both definition and resolution improvement is of the order of 0.1 $(1-B_0)$. In the discussion, symbols have the following meaning: B is the feed-back gain; $\Delta$ is the difference voltage supplied by difference mixer 10; $B_0$ is the zero signal gain when $\Delta=0$; and K is the attenuation constant, which may be adjusted by adjusting attenuator 8. The attenuation constant K determines the ratio of feed-back voltage supplied to the input of the feed-back loop, FBL, as against the feed-back voltage supplied to the differential mixer 10. The optimum value above stated is then found to be dependent on the value of $B_0$, on the slope of the B vs. $\Delta$ curve, and the limit values. As $B_0$ is increased, the slope of B vs. $\Delta$ increases, and $B_0$ also increases with the number of pulses per scan deriving from a single target. By making K variable, the system may readily be optimized by visual inspection of its output, while scanning a small target, and K adjusted until optimum resolution and definition is obtained.

Since the difference signal $\Delta$ is obtained by subtracting the input signal from the feed-back signal governed by the immediately preceding pulse, the absolute value of $\Delta$ tends to be relatively large during the rise of a signal envelope produced by scanning, to pass through zero at the peak of the output and to increase again during the decay. An improvement in performance may be expected, then, if the output signal is modulated in accordance with the difference, i.e. to accentuate the difference as a function of its absolute value. Whether or not this expedient is worth while depends on the signal to noise ratio, since in the presence of considerable noise the difference voltages lose a part of their significance. The utility of the expedient is further dependent on the general characteristics of the radar system, and particularly on whether or not a large number of pulses are received per scan. Obviously, if only a few pulses are received per scan over a single small target the difference voltage tends to be large, and hence significant with small signal-to-noise ratio.

Figure 3:
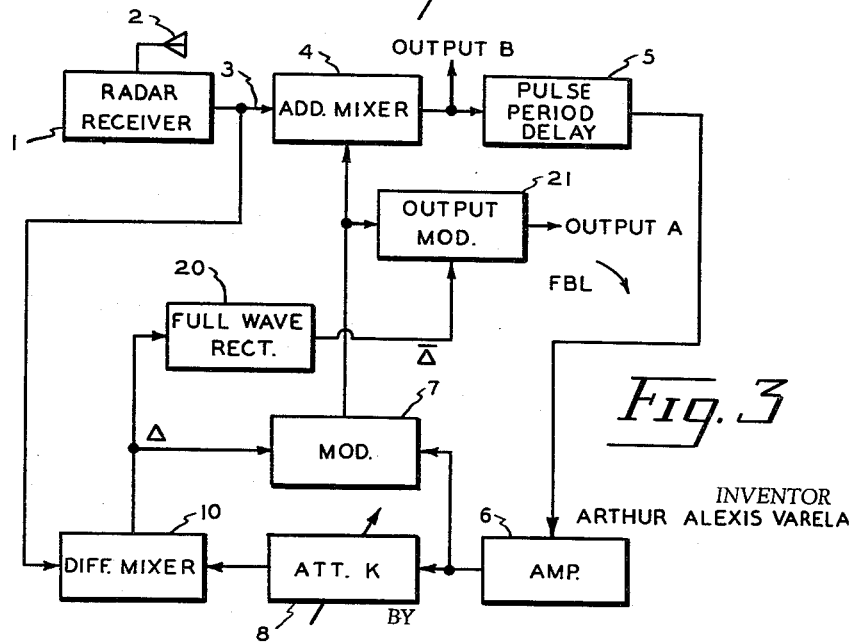
Figure 4:
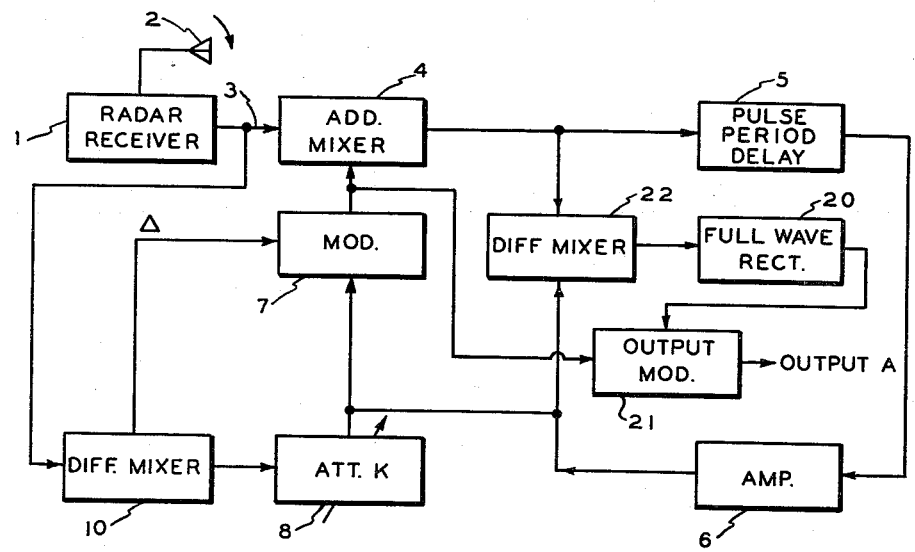

Systems for accomplishing the results briefly described in the previous paragraph are illustrated in FIGURES 3 and 4. The system of FIGURE 3 follows that of FIGURE 1. Accordingly, identical elements of the circuits of FIGURES 1 and 3 are identified by the same reference numerals, and the description thereof, is dispensed with. The novel elements employed are full wave-rectifier 20, which is supplied with input signal from difference mixer 10, and which controls the output of a modulator 21 connected in series with output A. The net result is that output A is controlled in amplitude by the absolute value of the difference voltage $\Delta$, as supplied by difference mixer 10.

Figure 5:
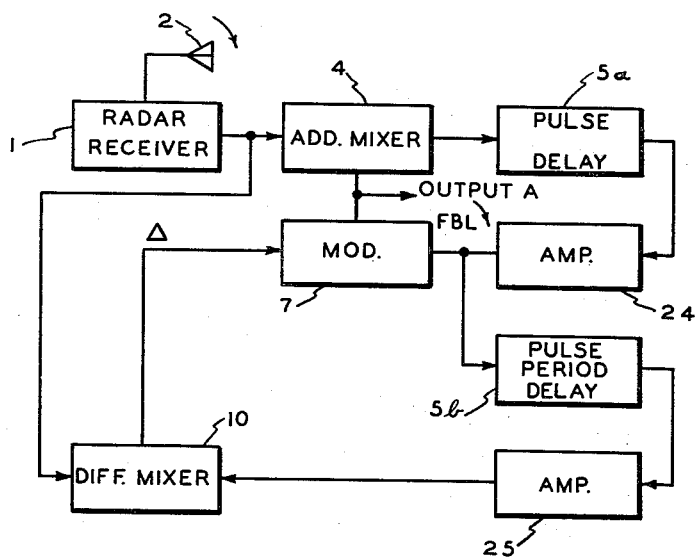

The system of FIGURE 4 follows that of FIGURE 1, and accordingly the same numerals of reference are employed in the separate figures to identify the same circuit elements, and the description of the latter is dispensed with in the interest of brevity. In FIGURE 4 the output A derived from the output of modulator 7, is modulated or controlled in amplitude by a further modulator 21, as in the system of FIGURE 3, and the modulator 21 is supplied with control signal by a full-wave rectifier 20, as in FIGURE 3. The distinction from FIGURE 3 resides in that the input to full-wave rectifier 20 is derived from a difference mixer, or subtraction circuit 22, which derives the difference in voltage between the output of additive mixer 4 and the input to attenuator 8, i.e. the difference of voltage between the input and output to the feed-back loop.

Where a large number of pulses are included in a beam scan, a marked improvement in definition over the foregoing devices may be obtained from a further system, employing a double pulse delay, and which is illustrated in FIGURE 5 of the accompanying drawings.

In the system of FIGURE 5, the output of radar receiver 2 is supplied to an additive mixer 4, and the output of the latter is supplied to a first pulse period delay device 5a. The output of the latter is amplified in amplifier 24, and the amplified output again delayed by a pulse period in pulse period delay device 5b. The output of the latter is amplified in amplifier 25, and applied to differential mixer 10, to which is also applied the direct output of radar receiver 2. The difference mixer 5 is applied to modulator 7, as a gain control device. The output of the first amplifier 24 is applied to modulator 7, for amplitude control thereby, and the amplitude controlled output of modulator 7 is applied to additive mixer 4, and also constitutes an output signal.

The system of FIGURE 5, accordingly, utilizes twice delayed pulses, for application to differential mixer 10, and thus accentuates the difference voltage output therefrom, which is employed to control the gain of the feedback loop, FBL. The expedient of FIGURE 5, i.e. the use of twice delayed pulses for comparison with the pulse output of the radar receiver 2, may clearly be extended to more than two pulse period delays, then the input to modulator 7, deriving from the delay loop, and intended as output signal, may consist of any one or more of the delayed pulses.

The echoes derivable from two targets at identical range, but separated about a beam width in azimuth, or less, will combine at a radar receiver with uncertain relative phase. If the relative phase is zero and remains zero, resolution between the signals is impossible, i.e. they represent effectively a single target. If the phase changes during a scan, however, this fact provides a basis on which resolution of the targets is possible. In the case of moving targets, such as aircraft, a phase change during a scan may amount to several cycles, depending on the nature and size of the aircraft and the frequency and beam width of the radar system. This phase change results in discrimination between adjacent targets at the same range, by the present system, because the present system is responsive to variation of pulse envelope shape, during beam scanning, and tends to accentuate the envelope height, without increasing its width, say at 3 db down.

The application of the present system to a complete radar equipment is indicated in FIGURE 1 of the accompanying drawings, identical circuitry being applicable in the remaining figures in the drawings.

In FIGURE 1, output pulses from the delay device are applied to a free running multivibrator 30 having a normal pulsing period slightly greater than the delay time of the delay device. Pulses from the multivibrator key the radar transmitter. In normal operation the multivibrator is tripped by pulses from the transmitter after passage through the receiver and delay device, and accordingly the pulse repetition period of the radar coincides with the delay period. In event of mis-fire of the transmitter, the succeeding keying pulse is supplied by free action of the multivibrator. This method of obtaining direct and delayed pulse coincidence is intended to be illustrative only and is not part of the invention. It will also be recognized that with presently common delay devices, such as quartz and mercury lines, it is desirable to convert the signals from video to an intermediate frequency such as fifteen mc. in order to obtain the required band width. This is usually accomplished in the prior art by modulation of a high frequency carrier by the signal prior to introduction to the delay line and by demodulation after amplification, elements for this purpose may be included in the delay device 5.

While I have described and illustrated a specific embodiment of my invention, it will be clear that various modifications thereof may be resorted to in respect to the general arrangement without departing from the true spirit and scope of the invention as defined in the appended claims.

What I claim is:

1. A radar receiver for pulsed radar signals, in which received periodic pulses are processed to improve radar definition, resolution, and contrast, including a source of direct pulses, means for integrating successive ones of said pulses including a pulse delay gain-controllable feed-back loop for delaying said direct pulses by an integral number of repetition periods of said pulses, including one repetition period, and means for adding direct and delayed pulses, means for measuring the difference in amplitude between simultaneous direct and delayed pulses, means responsive to said means for measuring for controlling the gain of said feed-back loop, and means for deriving processed output pulses from said means for integrating.

2. The combination in accordance with claim 1 wherein said means responsive to said means for measuring includes means for accentuating said difference in amplitude as a function of the absolute magnitude of said difference in magnitude.

3. The combination in accordance with claim 1 wherein said means for deriving processed output pulses is said means for controlling the gain of said feed-back loop.

4. The combination in accordance with claim 1 wherein said means for deriving processed output pulses is said means for adding direct and delayed pulses.

5. The combination in accordance with claim 1 wherein said means for deriving processed output pulses is in said feed-back loop.

6. The combination in accordance with claim 1 wherein said integral number is one.

7. The combination in accordance with claim 1 wherein said means for measuring the difference in amplitude of said direct and delayed pulses is a means for measuring the difference between pulses immediately adjacent in time.

8. The combination in accordance with claim 1 wherein said means for measuring the difference in amplitude of said direct and delayed pulses is a means for measuring the difference between pulses non-adjacent in time and separated by at least one pulse.

9. A radar receiver system in which a succession of received periodic pulses is processed to improve radar definition, resolution and contrast of a scanning radar system, including means for integrating the amplitudes of successive pulses to increase said contrast, and means for increasing the definition and resolution of said pulses, said last means comprising means for varying the relative amplitudes of successive pulses applied to said means for integrating as a function of the difference in amplitude between pulses of said succession of periodic pulses.

10. A scanning radar system including means for receiving successive pulse signals having a video envelope representative of said scanning, means for integrating the amplitudes of said pulses to increase contrast of said radar system, and means for controlling the relative amplitudes of successive pulses applied to said means for integrating as a function of the shape of said viedo envelope so as to provide a further shape of video envelope.

11. The combination in accordance with claim 10 wherein said means for controlling the relative amplitudes of said pulses includes means for deriving a control signal as a function of the amplitude difference between said first mentioned video envelope and said further video envelope.

12. The combination in accordance with claim 10 wherein said means for deriving a control signal is responsive to an amplitude difference between said first mentioned video envelope and said further video envelope.

13. The combination in accordance with claim 10 wherein said means for controlling is responsive to a function of the difference in amplitude between successive ones of said pulses.

14. In a pulse radar system having a device for improving the video output of said system, means for integrating said pulses comprising a pulse period delay device, means for comparing successive pulse amplitudes comprising said pulse period delay device, and means responsive to said means for comparing relative amplitudes of successive pulses integrated by said means for integrating for controlling said means for integrating.

15. In a system for treating recurrent pulses having a cycle of increasing followed by decreasing amplitudes, means for delaying sequential pulses by a time equal to an integral number fo pulse periods, including one, an additive mixer responsive simultaneously to each pulse and at least one preceding pulse derived from said means for delaying, a differential mixer responsive simultaneously to each pulse and at least one preceding pulse derived from said means for delaying to provide a differential output signal, and means responsive to said differential output signal for controlling the relative amplitudes of said pulses applied to said additive mixer.

16. The system in accordance with claim 15 wherein is further provided manual means for controlling the relative amplitudes of pulses applied to said additive mixer, for additive mixing thereby.

17. In a system for treating a series of recurrent echo pulses produced by scanning a pulsed radiation pattern with respect to a target, said series of recurrent echo pulses having a video pattern, the combination of means for additively mixing successive pulses with preceding pulses, means for subtractively mixing successive pulses with preceding pulses, and means for controlling said means for additively mixing in response to said means for subtractively mixing to modify said video pattern.

18. In a system for treating a series of recurrent echo pulses produced by scanning a pulsed radiation pattern with respect to a target, said series of pulses having a video pattern, a system for processing said pulses which includes means for continuously measuring the sums of amplitude functions of adjacent pulses, means for continuously measuring the difference of amplitudes of adjacent pulses, and means responsive to said differences of amplitudes for controlling said amplitude functions.

19. In a system for treating amplitude varying periodic echo pulses having a video envelope generated by relative scanning of pulsed radiation pattern across a target, a source of said pulses, at least one regenerative gain-controllable feed-back loop having a pulse delay equal to an integral number of the periods of said pulses, including one, an additive mixer for said pulses included in said at least one regenerative feed-back loop for adding relatively delayed pulses to provide additive pulses, a differential mixer for differentially combining relatively delayed pulses provided by said at least one regenerative feed-back loop to provide a differential signal, and means responsive to said differential signal to control the gain of said gain-controllable feed-back loop.

20. In a system for treating amplitude varying periodic echo pulses, in a periodically pulsed distance measuring system, a source of said pulses, a regenerative gain-controllable feed-back loop for said pulses having a pulse delay equal to an integral number of the periods of said pulses, including one, an additive mixer for said pulses responsive to relatively delayed pulses of said loop to provide additive pulses, a differential mixer for differentially combining relatively delayed ones of said pulses to derive a differential signal, and means responsive to said differential signal to control the gain of said feed-back loop.

21. In a system for treating amplitude varying periodic echo pulses, means for additively combining a superposition first and second pulses derived from relatively delayed pulses of said echo pulses, means for substractively combining in superposition first and second pulses derived from relatively delayed pulses of said echo pulses to provide an amplitude control signal, and means responsive to said amplitude control signal for controlling the relative amplitudes of said first and second pulses.

22. In a scanning radar system wherein a periodically pulsed directional radiation pattern is scanned across a target, and wherein periodic pulses are returned from the target to a receiver, generating a video pattern therein, said pattern having positively and negatively sloping portions, and wherein is provided an integrator for said pulses including a regenerative feed-back loop having a delay time equal to an integral number, including one of pulse periods whereby functions of successive pulses are additively combined, the combination including means for measuring the instantaneous slope of said video pattern to provide a slope signal, means for varying the gain of said feed-back loop in response to a gain control signal, and means for applying said slope signal as said gain control signal.

23. The combination in accordance with claim 22 wherein said means to provide a slope signal includes means for providing a slope signal of opposite sense during said positively and negatively sloping portions of said video pattern, and means for applying said gain control signal in such sense and amplitude that gain of said feed-back loop increases during said positively sloping portion and decreases during said negatively sloping portion, said gain signal selected to provide an increase of resolution, contrast and definition of said radar system.

References Cited in the file of this patent

UNITED STATES PATENTS 2,487,995   Tucker _____ Nov. 15, 1949